United States Patent
Shanmuganathan et al.

(10) Patent No.: US 9,898,061 B2
(45) Date of Patent: Feb. 20, 2018

(54) RESOURCE CAPACITY MANAGEMENT IN A CLUSTER OF HOST COMPUTERS USING POWER MANAGEMENT ANALYSIS

(71) Applicant: VMware, Inc., Palo Alto, CA (US)

(72) Inventors: Ganesha Shanmuganathan, Santa Clara, CA (US); Anne Holler, Los Altos, CA (US); Aashish Parikh, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 180 days.

(21) Appl. No.: 14/566,401

(22) Filed: Dec. 10, 2014

(65) Prior Publication Data

US 2016/0170462 A1 Jun. 16, 2016

(51) Int. Cl.
| | | |
|---|---|---|
| G06F 9/46 | (2006.01) | |
| G06F 1/28 | (2006.01) | |
| G06F 11/30 | (2006.01) | |
| G06F 9/455 | (2018.01) | |
| G06F 11/34 | (2006.01) | |

(52) U.S. Cl.
CPC ............ G06F 1/28 (2013.01); G06F 9/45558 (2013.01); G06F 11/3062 (2013.01); G06F 11/3442 (2013.01); G06F 2009/4557 (2013.01); G06F 2201/815 (2013.01); Y02B 60/165 (2013.01)

(58) Field of Classification Search
CPC .... G06F 1/3203; G06F 1/3287; G06F 9/5094; G06F 1/28; G06F 11/3062; G06F 9/45558; G06F 11/3442; G06F 2009/4557; G06F 2201/815; Y02B 60/165

USPC .................................................. 718/104, 100
See application file for complete search history.

(56) References Cited

U.S. PATENT DOCUMENTS

| | | | | |
|---|---|---|---|---|
| 7,788,671 | B2 * | 8/2010 | Black-Ziegelbein . | G06F 9/5061 709/220 |
| 8,738,333 | B1 * | 5/2014 | Behera ................. | G06F 9/5061 703/2 |
| 9,047,087 | B2 * | 6/2015 | Antony ............... | G06F 11/3442 |
| 9,330,424 | B2 * | 5/2016 | Parikh .................... | G06Q 50/06 |
| 9,529,642 | B2 * | 12/2016 | Holler ................... | G06F 9/5094 |
| 2005/0160133 | A1 * | 7/2005 | Greenlee ................ | G06F 9/505 709/200 |
| 2005/0278439 | A1 * | 12/2005 | Cherkasova ............ | H04L 67/06 709/223 |
| 2010/0070784 | A1 | 3/2010 | Gupta et al. | |
| 2011/0191477 | A1 * | 8/2011 | Zhang ................... | G06F 15/173 709/226 |
| 2013/0014107 | A1 * | 1/2013 | Kirchhofer ........... | G06F 9/5083 718/1 |

(Continued)

OTHER PUBLICATIONS

Moore, Justin, et al. "Managing mixed-use clusters with Cluster-on-Demand." Cluster-on-Demand Draft, Internet Systems and Storage Group, Duke University (2002), pp. 12.*

*Primary Examiner* — Benjamin Wu
*Assistant Examiner* — Willy W Huaracha

(57) ABSTRACT

A resource management system and method for performing resource capacity management in a cluster of host computers uses a snapshot of the cluster with one or more ghost host computers added to the cluster to execute a power management analysis. A ghost host computer is a fictitious construct based on a physical host computer. The results of the power management analysis may then be used as a cluster capacity recommendation to increase resource capacity of the cluster of host computers.

22 Claims, 8 Drawing Sheets

(56) References Cited

U.S. PATENT DOCUMENTS

| | | | |
|---|---|---|---|
| 2013/0227558 A1* | 8/2013 | Du | G06F 9/5077 718/1 |
| 2014/0059008 A1* | 2/2014 | Parikh | G06F 17/30566 707/639 |
| 2015/0178137 A1* | 6/2015 | Gordon | H04L 67/1008 709/226 |

* cited by examiner

50 

| Algorithm 1: Capacity planning using DPM |
|---|
| Input: Snapshot of entire cluster (hosts and VMs) |
| foreach *host h in cluster* do |
|     If $h$ is not in standby mode     Create a ghost host $g$ that is identical to $h$ |
|       Mark $g$ as in standby mode and add to snapshot |
| |
| Run one pass of DPM power-on algorithm to power on a single host |
| while *DPM recommends a host k for power-on* do |
|     clone $k$ as $l$ |
|     Mark $l$ as in standby mode and add to snapshot |
|     Run one pass of DPM power-on algorithm to power on a single host |
| foreach *host h recommended by DPM* do |
|     Convert power-on recommendation into capacity recommendation |
|     Recommend a host with same capacity as $h$ connected to same set of datastore and networks as $h$ |
| Remove all the ghost hosts from the cluster |

FIG. 4

RESOURCE CAPACITY MANAGEMENT IN A CLUSTER OF HOST COMPUTERS USING POWER MANAGEMENT ANALYSIS

BACKGROUND

A virtual machine (VM) is a software-based emulation of a physical computer. Although virtual machines are software-based emulations, the emulations still utilize physical resources in physical machines referred to as host computers.

A virtual machine management server, such as VMware® vCenter Server™, can provide a centralized way of managing virtual infrastructure resources like computation, storage, networks, etc. Infrastructure resources can also be aggregated and grouped using abstractions such as a cluster of host computers. Datastores can similarly be grouped into datastore clusters.

A resource management module, such as VMware vSphere® Distributed Resource Scheduler™, can be employed and configured to perform various management functions in order to efficiently allocate resources within host computers to VMs in a cluster. A resource management module can provide a way of performing intelligent and automatic resource management within a cluster. For example, the resource management module can perform automatic initial placement of a virtual machine within a cluster.

A power management module, such as VMware vSphere® Distributed Power Management™, can be employed and configured to opportunistically save power by dynamically right-sizing cluster capacity to match workload demands while respecting all cluster constraints. For example, the power management module recommends VM evacuation and powering-off hosts when the cluster has sufficient capacity such as CPU and memory capacity. It recommends powering-on hosts when resource utilization increases appropriately or additional host resources are needed to meet cluster constraints.

However, efficiently managing cluster resources can be complex and difficult with cluster demands varying from one workload to another. In addition, when additional resource capacity is needed in a cluster, determining the amount and type of resources to add to the cluster can be challenging.

SUMMARY

A resource management system and method for performing resource capacity management in a cluster of host computers uses a snapshot of the cluster with one or more ghost host computers added to the cluster to execute a power management analysis. A ghost host computer is a fictitious construct based on a physical host computer. The results of the power management analysis may then be used as a cluster capacity recommendation to increase resource capacity of the cluster of host computers.

A method for performing resource capacity management in a cluster of host computers in accordance with an embodiment of the invention comprises generating a snapshot of the cluster of host computers that is a representation of a state of the cluster of host computers, adding a ghost host computer to the snapshot of the cluster of host computers, the ghost host computer being a fictitious construct based on a physical host computer, and executing a power management analysis on the cluster using the snapshot with the ghost host computer, wherein a recommendation of powering on the ghost host computer as a result of the power management analysis is used as a cluster capacity recommendation to increase resource capacity of the cluster of host computers. In some embodiments, the steps of this method are performed when program instructions contained in a computer-readable storage medium are executed by one or more processors.

A cluster management system in accordance with an embodiment of the invention comprises a physical cluster comprising at least one physical host computer, a cluster capacity management module and a power management module. The cluster capacity management module is configured to generate a snapshot of the physical cluster that is a representation of a state of the physical cluster. The cluster capacity management module is further configured to add a ghost host computer to the snapshot of the physical cluster. The ghost host computer is a fictitious construct based on a physical host computer. The power management module is configured to execute a power management analysis on the snapshot of the physical cluster with the ghost host computer. A recommendation of powering on the ghost host computer as a result of the power management analysis is used as a cluster capacity recommendation to increase resource capacity of the cluster of host computers.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 4 depicts one embodiment of an algorithm for generating a ghost host.

Throughout the description, similar reference numbers may be used to identify similar elements.

DETAILED DESCRIPTION

Figure 1:
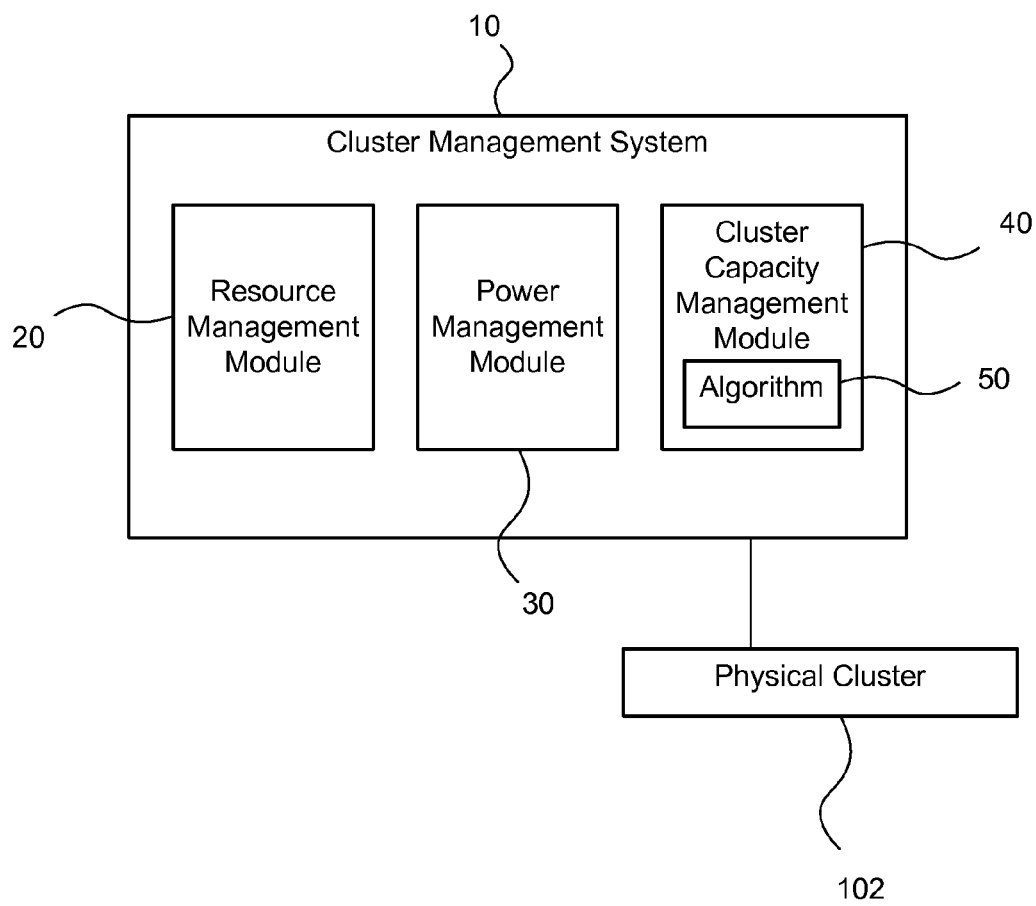
FIG. 1 depicts a schematic block diagram of one embodiment of a cluster management system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the embodiments implement a cluster management system to manage a cluster to handle a variety of workloads. A cluster is formed with one or more host computers (sometimes referred to herein as "hosts"). The host computers may be running virtual machine (VM) or virtual machine management server processes to perform a workload. Because workloads vary in demand on a cluster in order to perform the workload, it can be beneficial to modify the cluster to efficiently handle each individual workload. A power management module of the cluster management system may be implemented to assist with workload processing optimization. With this module, the cluster management system can save power by adjusting cluster capacity according to workload capacity requirements. The power management module may evacuate and/or power-off or power-on hosts depending on the comparison of the capacity of the cluster relative to the workload demand. The power management module may also resize a cluster to match the demands of a workload while taking into consideration certain cluster constraints. In addition, a cluster capacity management module of the cluster management system provides recommendations to add more resources to the cluster to more efficiently handle workloads with minimized resource contentions. As described in more detail below, the cluster capacity management module uses an analysis operation performed by the power management module to make cluster capacity recommendations.

Embodiments described below provide for selection of resources to add to a cluster. The embodiments below describe generation of ghost host computers or "ghost hosts" from physical host computers or "physical hosts" in the cluster or outside of the cluster. A ghost host is a non-physical, fictitious construct derived from a physical host by cloning the physical host to create a non-physical or "ghost" host (one that does not actually exist in the physical cluster). The ghost host may be included in a "snapshot" of the cluster.

In an embodiment, a snapshot of a cluster is a representation of the state of the cluster that contains at least configuration and resource usage information of the cluster at a particular moment in time. The snapshot may include the current configurations of hosts and clients, such as VMs or other software processes, running on the hosts in the cluster. These configurations of the hosts and the clients may include hardware and software configurations of each host, client hosting information and client information. The snapshot may also include the current configuration of storage associated with the cluster, including configurations of storage devices and datastores in the storage. In addition, the snapshot may also include requirements and preferences of components in the cluster. The snapshot may also include the resource capacity of the cluster, current resource usage information for various components of the cluster, including historical resource usage information in the cluster, as well as currently available resources in the cluster. Lastly, the snapshot may also include resource allocation statistics, such as how often a client has been moved to different host computers or how often a client has consumed the entire resource allotted to that client.

In some embodiments, the ghost host is counted by the power management module as a potential resource to power-on in the cluster even though the ghost host is not an actual resource with any real capacity. However, the ghost host provides a possible resource for the cluster capacity management module to recommend as a candidate for addition to the cluster. The ghost host may be generated as an exact copy of a physical host or the ghost host may be a variation on a physical host in one or more characteristics. This allows the power management module to select from a wider range of resources with a potentially infinite amount of variety to "power-on" so that the cluster capacity management module can identify and recommend a resource that is a better fit for addition to the cluster.

The ghost host is generated and saved in a snapshot considered by the power management module for selection of resources to be recommended for power-on. Selection of a non-physical ghost host construct over the physical hosts available indicates that the characteristics of the ghost host are preferable to those of the physical host. This allows the cluster capacity management module to recommend adding a physical host to the cluster that matches or is similar to the characteristics of the selected ghost host.

In some embodiments, if a ghost host is selected to be powered-on in the cluster by the power management module, another ghost host may be generated to take the place of the selected ghost host so that the power management module may select more than one instance of the same ghost host. The user may specify the number of ghost hosts, characteristics, variations, physical hosts that should be used to derive ghost hosts, and other aspects of the process. Embodiments are described in greater detail below.

FIG. 1 depicts a schematic block diagram of one embodiment of a cluster management system 10. The illustrated embodiment is in communication with a physical cluster 102 to manage resources within the cluster 102. The illustrated embodiment of the cluster management system 10 includes a resource management module 20, a power management module 30, a cluster capacity management module 40 and an algorithm 50.

In some embodiments, the resource management module 20 performs various management functions in order to efficiently allocate resources within hosts in a cluster 102. The resource management module 20 can provide a way of performing intelligent and automatic resource management within the cluster. For example, the resource management module 20 can perform automatic initial placement of a virtual machine within the cluster. Other functionality may be performed by the resource management module 20.

The power management module 144 is a feature of the cluster management system 10 that performs a power management analysis on a snapshot of the cluster 102 to opportunistically save power by dynamically right-sizing cluster capacity to match workload demands while respecting all cluster constraints. For example, the power management module 144 may recommend host evacuation and powering-off when the cluster 102 has sufficient capacity in such resources as CPU and memory capacity. It recommends powering-on hosts when resource utilization increases appropriately or additional host resources are needed to meet cluster constraints. In some embodiments, the power management module 144 may run other various routines and protocols.

The cluster capacity management module 40 manages cluster capacity by generating a capacity recommendation based on powering-on recommendations of the power management module 30. The cluster capacity management module 40 generates one or more ghost hosts, which are marked as being on stand-by, for the power management module to consider powering on so that cluster capacity management module can determine if additional resource capacity is needed for the cluster. The cluster capacity management module 40 may generate the ghost hosts through execution of the algorithm 50. The algorithm 50 is described in greater detail with reference to FIG. 4.

In some embodiments, the cluster capacity management module 40 takes in a snapshot of the cluster 102 and generates one or more ghost hosts which are added to the snapshot. The cluster capacity management module 40 outputs the snapshot with the one or more ghost hosts, which are indicated as being on stand-by mode, to the power management module 30. The power management module considers the snapshot with the ghost hosts and creates a recommendation to power-on one or more hosts, which may include one or more ghost hosts. The recommendation is then converted to a capacity recommendation by the cluster capacity management module 40 specifying, for example, the capacity of a host that should be added, the manner in which the host should be connected, associated datastores, and network configurations. Less or more information may be incorporated in the capacity recommendation.

In some embodiments, the cluster management system 10 is executed on a central server or other location by one or more processors of a physical computer system. In another embodiment, the system 10 is executed at a remote or satellite location. In other embodiments, various components or modules of the system 10 may be stored or executed at a combination of remote or central locations or a series of remote locations. In a particular implementation, the cluster management system 10 is a VMware® vCenter™ server with at least some of the features available for such a server ("VMware" and "vCenter" are trademarks of VMware, Inc.).

Figure 2A:
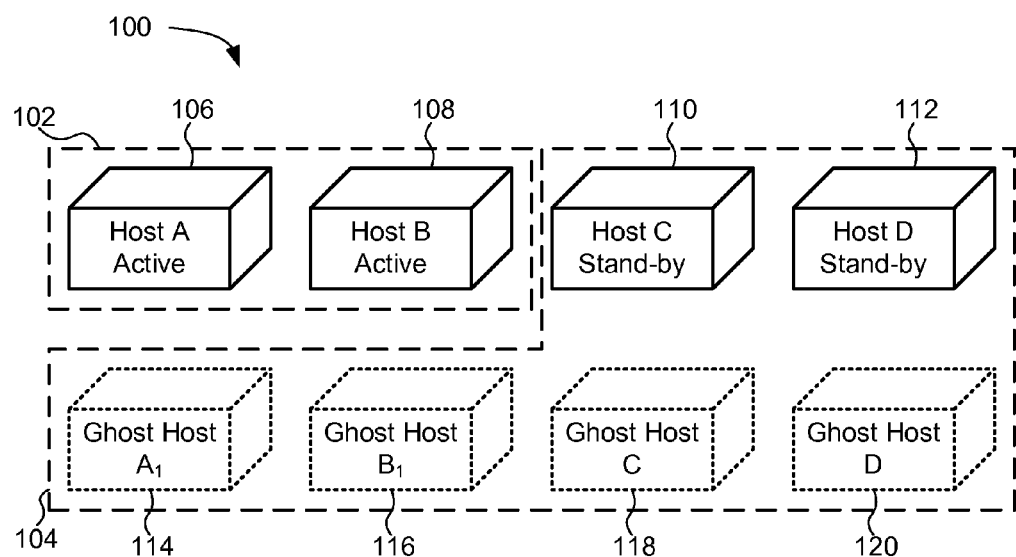
FIG. 2A is a schematic block diagram of one embodiment of a host network, which can be represented by a snapshot on which a power management analysis can be performed.

FIG. 2A is a schematic block diagram of one embodiment of a host network 100, which can be represented by a snapshot on which a power management analysis can be performed by the power management module 30. The host network 100 includes a cluster 102 and available hosts 104. The cluster 102 includes one or more hosts. The illustrated embodiment depicts Host A 106 as active and included in the cluster 102. Similarly, the cluster 102 depicts Host B 108 as active and within the cluster 102. In the illustrated embodiment the cluster 102 includes the assets and capacities of Host A 106 and Host B 108. In some embodiments, the cluster 102 may include active and stand-by hosts. Any workload that is sent to the cluster 102 would be checked to determine the capacity required to perform the workload. The capacity required to perform the workload would be checked against the capacity of the cluster 102. If Host A 106 and Host B 108 are insufficient to perform the workload within a performance threshold, the power management module 30 checks the available hosts 104 for capacity that might be added to the cluster 102.

The available hosts 104 include Host C 110 and Host D 112 which are on stand-by. In some embodiments, Host C 110 and Host D 112 may still be associated or included in the cluster 102. In other embodiments, Host C 110 and Host D 112 are not considered part of the cluster 102 based on their stand-by status. Host C 110 and Host D 112 may also be hosts that were evacuated from the cluster 102. The available hosts 104 may also include other hosts with other relative connections or separations from the cluster 102.

The available hosts 104 also include Ghost Host $A_1$ 114, Ghost Host $B_1$ 116, Ghost Host C 118, and Ghost Host D 120. The Ghost Hosts 114, 116, 118, and 120 are derived from the corresponding Hosts A, B, C, and D 106, 108, 110, and 112. In some embodiments, the Ghost Hosts 114, 116, 118, and 120 are direct but non-physical copies or duplicates of the corresponding physical Hosts A, B, C, and D 106, 108, 110, and 112. In other embodiments, the Ghost Hosts 114, 116, 118, and 120 vary in one or more characteristics from characteristics of the corresponding Hosts A, B, C, and D 106, 108, 110, and 112. For example, Ghost Host D 120 is derived from Host D 112. Ghost Host D 120 may mimic the exact characteristics (e.g., CPU capacity, memory capacity) of Host D 112. Ghost Host D 120 may also be a scaled or modified derivation of Host D 112. For example, Ghost Host D 120 may have a CPU capacity and/or memory capacity that is half that of Host D 112. Other variations may include other percentages, scales, balances, or distributions of resources in the ghost hosts relative to the corresponding physical hosts.

Figure 2B:
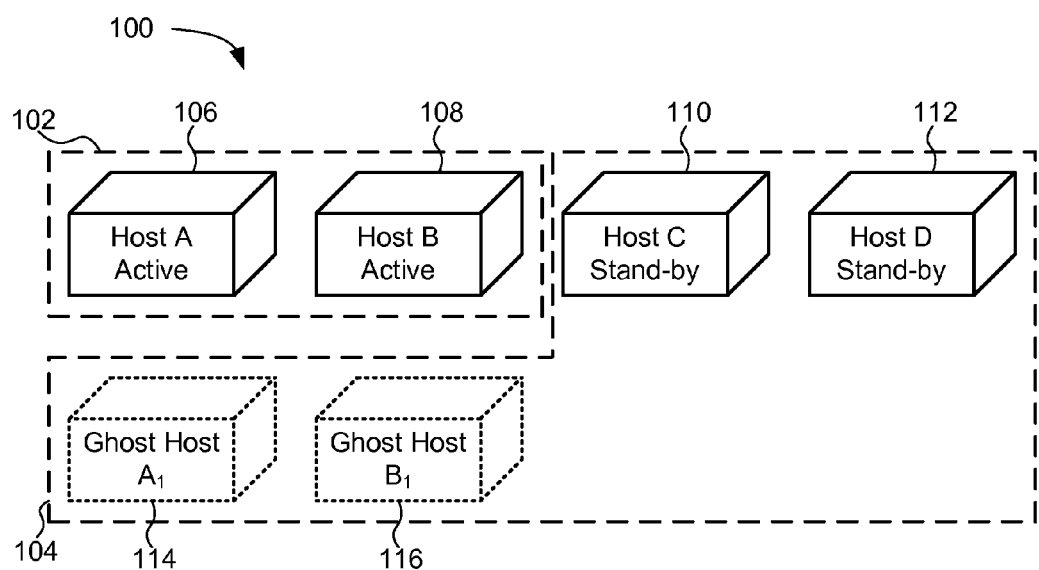
FIG. 2B is a schematic block diagram of another embodiment of a host network, which can be represented by a snapshot on which a power management analysis can be performed.

FIG. 2B is a schematic block diagram of another embodiment of a host network 100, which can be represented in a snapshot on which a power management analysis can be performed by the power management module 30. In the illustrated embodiment, Ghost Host $A_1$ 114 and Ghost Host $B_1$ 116 are generated while no ghost hosts are created for hosts C 110 and D 112 because they are in stand-by and currently available for addition to the cluster 102. Other embodiments may generate fewer or more ghost hosts corresponding to some other combination of the active and stand-by hosts.

Figure 2C:
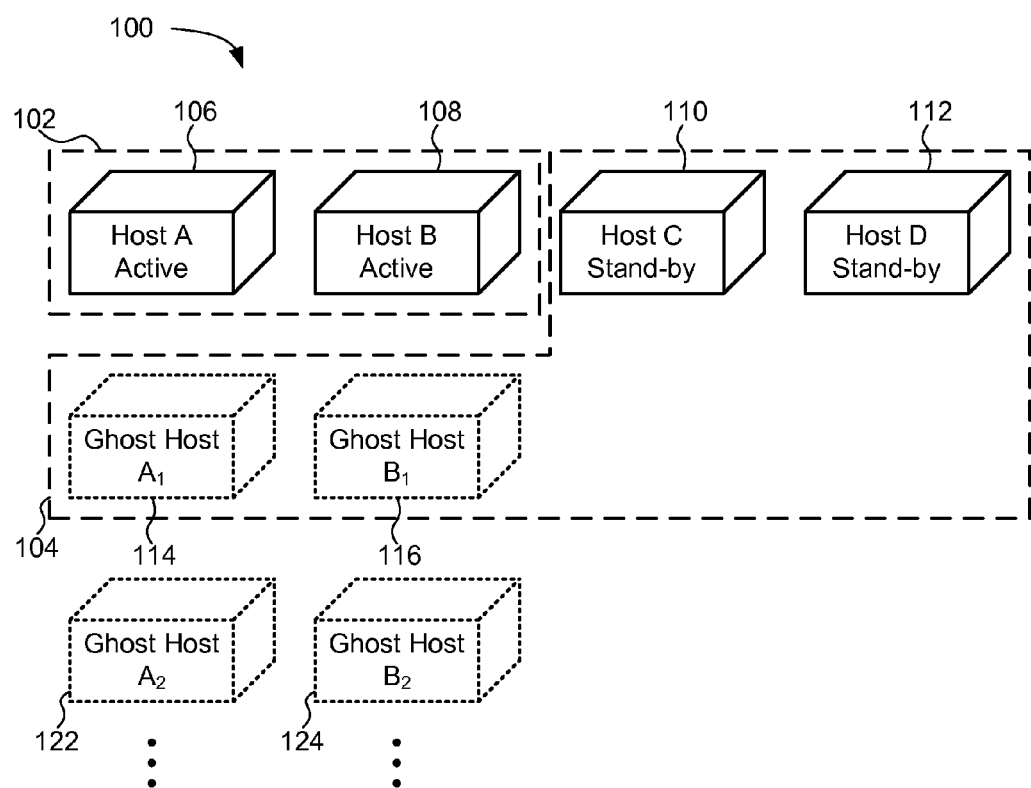
FIG. 2C is a schematic block diagram of another embodiment of a host network, which can be represented by a snapshot on which a power management analysis can be performed.

FIG. 2C is a schematic block diagram of another embodiment of a host network 100, which can be represented by a snapshot on which a power management analysis can be performed by the power management module 30. In the illustrated embodiment, multiple ghost hosts are derived from a single host. In the depicted embodiment, Host A 106 is used to derive Ghost Host $A_1$ 114 and Ghost Host $A_2$ 122. In some embodiments, Ghost Host $A_2$ 122 is generated at substantially the same time as Ghost Host $A_1$ 114. In another embodiment, Ghost Host $A_2$ 122 is generated in response to selection of Ghost Host $A_1$ 114 as a recommended addition for cluster 102. Any number of variations or copies of the hosts 106, 108, 110, and/or 112 may be created. In this manner, the power management module 30 may search a large pool of available hosts 104. This will allow for a higher probability of finding a good fit to adjust the capacity of the cluster 102 to match a workload.

Criteria for generation of the ghost hosts may also be specified. The criteria may be set automatically, carried over from a previous ghost host generation, or manually set. For example, the criteria may dictate that ghost hosts only be generated from active hosts. The criteria may also indicate that ghost hosts should not be generated from one or more hosts or groups of hosts. As another example, the criteria may specify that hosts with a certain range of CPU capacity may be excluded or included. The criteria may require that the host have above a threshold capacity of memory in order to derive a ghost host from the host. Other criteria may also be used.

Figure 2D:
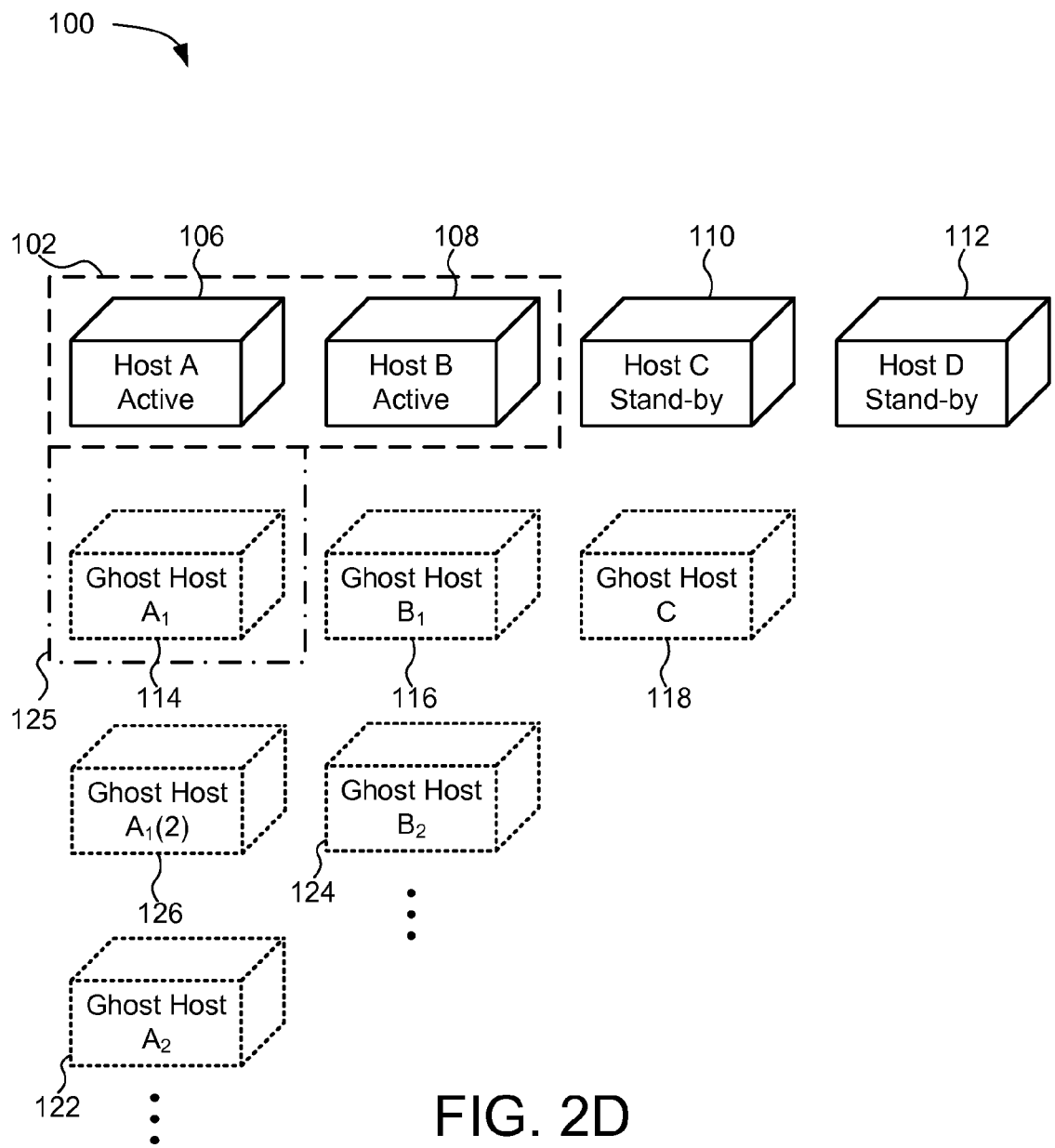
FIG. 2D is a schematic block diagram of another embodiment of a host network, which can be represented by a snapshot on which a power management analysis can be performed.

FIG. 2D is a schematic block diagram of another embodiment of a host network 100, which can be represented by a snapshot on which a power management analysis can be performed by the power management module 30. In the illustrated embodiment, Ghost Host $A_1$ 114 has been previously selected (denoted by box 125) to be powered on in the cluster 102. Consequently, Ghost Host $A_1(2)$ 126 is generated. In some embodiments, Ghost Host $A_1(2)$ 126 is generated upon selection of Ghost Host $A_1$ 114. In other embodiments, replacement ghost hosts may be generated after a program cycle is run to check capacity of the cluster with the new ghost host added. Generation of replacement ghost hosts may allow the network 100 to provide the option of selecting multiple copies of the same ghost host or a physical host and one or more ghost hosts derived from the physical host. Providing one or more ghost hosts with replacements that can be recommended to be powered on by the power management module 30 allows the cluster capacity management module 40 to make efficient and well-tailored suggestions for modification of the cluster 102.

In some embodiments, Ghost Host $A_1(2)$ 126 is generated as an exact copy of Ghost Host $A_1$ 114. In other embodiments, Ghost Host $A_1(2)$ 126 is a variation or scaled derivation of Ghost Host $A_1$ 114. In some embodiments, an exact copy ghost host and a modified ghost host may be generated simultaneously or separately.

The illustrated embodiment also depicts a situation where no ghost host is derived from Host D 112. This may be a result of a determination that Host D 112 does not meet one or more criteria for ghost host generation. For example, one or more initial criteria may be set which prevents the power management module 30 from considering Host D 112 for ghost host generation. One or more criteria may be set to prevent duplication of one or more specific hosts or host configurations or to control cost or availability issues. The criteria may relate to host status, CPU capacity, memory capacity, usage history, current or projected host demand, or other characteristics or information relating to the host, workload, or cluster.

Figure 3:
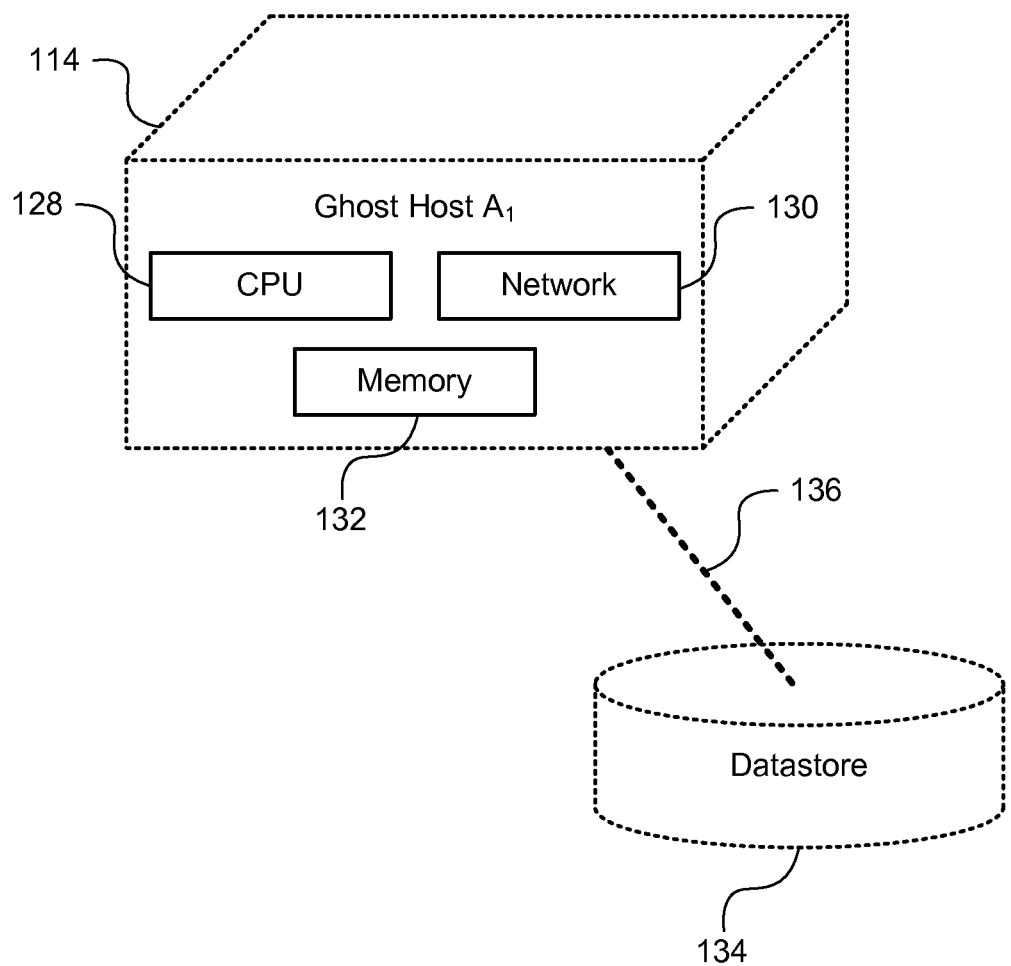
FIG. 3 depicts a schematic block diagram of one embodiment of a ghost host.

FIG. 3 depicts a schematic block diagram of one embodiment of the ghost host 114. The illustrated embodiment of the ghost host 114 includes a CPU capacity 128, a network connection 130, and a memory capacity 132. The ghost host 114 may also include an associated datastore 134 with a corresponding datastore connection 136. As described above, each of these characteristics may be copied from a physical host from which the ghost host 114 is derived. In some embodiments, one or more of the characteristics may be changed, removed, scaled, or copied exactly from the physical host.

The datastore 134 and associated connection 136 may be included with the associated ghost host 114. In some embodiments, the cluster capacity management module 40 may elect to maintain the connection 136 to the datastore 134 or dissociate the ghost host 114 from the datastore 134 for the purposes of generating the ghost host 114. In some embodiments, the ghost host 114 may retain the connection 136 to the datastore 134 for reevaluation prior to actually adding a resource to the cluster. For example, if it is determined that the ghost host 114 is needed for the CPU capacity 128 and not for the datastore 134, the datastore 134 may be removed from the ghost host 114. In other embodiments, other connections (not shown) may be created to associate the ghost host 114 to other resource (not shown). Because the ghost host 114 is derived from a physical host that may already be a part of the cluster, the connection 136 to the same datastore 134 may not be a viable candidate for an additional resource for the cluster. Some embodiments may address this by assigning another similar datastore to the ghost host 114 before or after selection by the cluster capacity management module 40 as a recommended cluster supplement or by maintaining the same datastore in connection with the ghost host 114. In some embodiments, the ghost host 114 may include other characteristics or components as well as other manners of preparing or modifying the ghost host 114 and associated resources.

FIG. 4 depicts one embodiment of the algorithm 50 for generating a ghost host. The illustrated embodiment uses a particular power management module in the form of a VMware vSphere® Distributed Power Management™ or DPM. The algorithm 50 takes an input of a snapshot of the cluster. The algorithm 50 then generates a ghost host for each active host in the cluster. The status of the ghost host is then set to stand-by and the ghost host is added to the snapshot. The power management module is run on the snapshot to select a single host to be powered on in the cluster.

If a host is chosen to be powered on, a ghost host is cloned from the selected host (the selected host may be a ghost host or physical host) and the ghost host is set to stand-by. For each ghost host selected by the power management module, the recommendation to power-on the ghost host is converted to a capacity recommendation that specifies a host configuration that the system can use to locate a matching or similar physical host to add to the cluster. When no additional host is recommended to be powered on by the power management module, the ghost hosts are removed from the snapshot and the illustrated embodiment of the algorithm 50 ends.

Some embodiments of the algorithm 50 may create more than one ghost host. For example, when the algorithm 50 clones the hosts to generate the ghost host, it may generate a plurality of ghost hosts with variations in the configurations of each ghost host. The variations may be in CPU, memory, network connectivity, datastore connection, or other characteristics of the ghost host. In another embodiment, the algorithm 50 selects multiple hosts for power-on. For example, the algorithm 50 may combine multiple hosts with a combined capacity sufficient to perform a workload.

In some embodiments, the algorithm 50 may receive input of a snapshot that includes hosts not currently in the cluster. The snapshot may include hosts within the cluster as well as one or more hosts that are outside of the cluster. Host may be powered-off or previously evacuated from the cluster. The hosts in the snapshot may also be hosts available for addition to the cluster but not currently or previously associated with the cluster. Other embodiments may include fewer or more processes to provide more or less functionality.

In an embodiment, the power management module 30 incorporates a high formula for determining a high utilization score. One example of a high formula is:

$$\mathrm{HighUtilizationScore} = \sqrt{\Sigma \mathrm{DistanceAboveThreshold}^2}$$

The illustrated high formula takes in the load on each host above a threshold and sums the total for the cluster. In some embodiments, the load is calculated over an extended time period. The threshold may be set automatically or manually. One example is a high threshold set at 81%. However, a different threshold may be selected based on performance considerations such as time constraints, power demands, system robustness, or other physical or process considerations. The threshold may also be chosen arbitrarily or based on some other consideration. The high utilization score output by the high formula is considered by the power management module 30 for host power-on recommendations. Some embodiments may include further calculation or refinement to achieve other outputs or include other factors.

The power management module 30 may also incorporate a low formula for determining a low utilization score. One example of the low formula is:

$$\mathrm{LowUtilizationScore} = \sqrt{\Sigma \mathrm{DistanceBelowThreshold}^2}$$

Calculation and inputs for the low formula are similar to that described above with relation to the high formula. However, the low formula operates on input for the host loads under a low threshold. For example, the threshold may be set at 45%. However, a different threshold may be selected based on performance considerations such as time constraints, power demands, system robustness, or other physical or process considerations. The threshold may also be chosen arbitrarily or based on some other consideration. The low utilization score output by the low formula is considered by the power management module 30 for host power-off recommendations. Some embodiments may include further calculation or refinement to achieve other outputs or include other factors.

Figure 5:
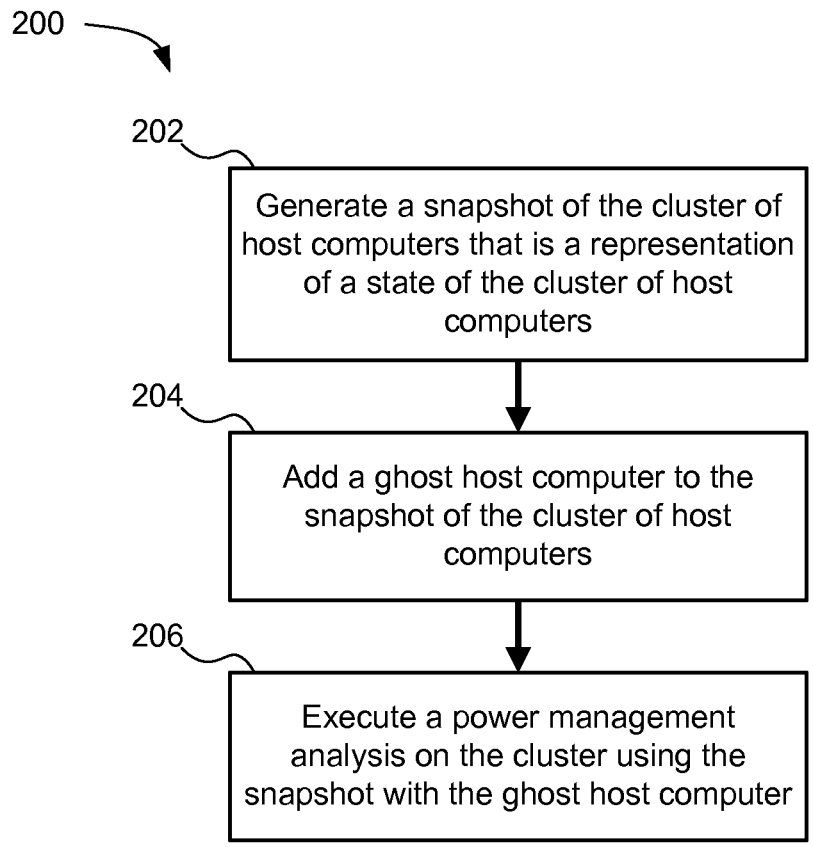
FIG. 5 depicts a block flow chart of one embodiment of a method for cluster management.

FIG. 5 depicts a block flow chart of one embodiment of a method 200 for performing resource capacity management in a cluster of host computers. At block 202, a snapshot of the cluster of host computers is generated that is a representation of a state of the cluster of host computers. At block 204, a ghost host computer is added to the snapshot of the cluster of host computers. The ghost host computer is a fictitious construct based on a physical host computer. At block 206, a power management analysis is executed on the cluster using the snapshot with the ghost host computer. A recommendation of powering on the ghost host computer as a result of the power management analysis is used as a cluster capacity recommendation to increase resource capacity of the cluster of host computers.

Although the operations of the method(s) herein are shown and described in a particular order, the order of the operations of each method may be altered so that certain operations may be performed in an inverse order or so that certain operations may be performed, at least in part, concurrently with other operations.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing resource capacity management in a cluster of physical host computers, the method comprising:

generating a snapshot of the cluster of physical host computers that is a representation of a state of the cluster of host computers;

generating a ghost host computer and adding the ghost host computer to the snapshot of the cluster of physical host computers, the ghost host computer being a fictitious construct based on a physical host computer;

executing a power management analysis on the cluster using the snapshot with the ghost host computer to create a recommendation of powering on the ghost computer or a stand-by physical host computer, wherein a recommendation of powering on the ghost host computer as a result of the power management analysis is converted as a cluster capacity recommendation to increase resource capacity of the cluster of physical host computers, the capacity recommendation specifying at least the capacity of a host computer that should be added;

locating and adding a matching or similar host computer based on the cluster capacity recommendation; and when the ghost host computer or a second physical host computer in the cluster that is in stand-by mode is selected for power-on during the power management analysis, adding another ghost host computer to the snapshot with the ghost host computer and setting the another ghost host computer to stand-by mode, the another ghost host computer being a duplicate of the ghost host computer or the second physical host computer.

2. The method of claim 1, wherein the ghost host computer is a duplicate of one of the physical host computers in the cluster.

3. The method of claim 2, wherein the adding the ghost host computer includes adding at least one ghost host computer for each of the physical host computers in the cluster that is not in stand-by mode, the at least one ghost host computer for each of the physical host computers being a duplicate of that physical host computer in stand-by mode.

4. The method of claim 1, wherein the ghost host computer is a modified version of the physical host computer such that at least one characteristic of the ghost host computer is modified to have a different value than the corresponding characteristic of the physical host computer.

5. The method of claim 1, further comprising adding the another ghost host computer to the snapshot when the ghost host computer is selected during the power management analysis for power-on, the another ghost host computer being a duplicate of the ghost host computer.

6. The method of claim 5, further comprising adding a second another ghost host computer to the snapshot when the another ghost host computer is selected during the power management analysis for power-on, the second another ghost host computer being a duplicate of the another ghost host computer.

7. The method of claim 1, further comprising adding the another ghost host computer to the snapshot when the second physical host computer in the cluster is selected during the power management analysis for power-on, the another ghost host computer being a duplicate of the second selected physical host computer.

8. The method of claim 1, further comprising recommending, after the ghost host computer is selected to be powered on by the power management analysis, a physical host computer with same resource capacity of the ghost host computer and connected to same set of datastore and networks as the ghost host computer to increase the resource capacity of the cluster of physical host computers.

9. A non-transitory computer-readable storage medium containing program instructions for performing resource capacity management in a cluster of physical host computers, wherein execution of the program instructions by one or more processors of a computer system causes the one or more processors to perform steps comprising:
generating a snapshot of the cluster of physical host computers that is a representation of a state of the cluster of host computers;
generating a ghost host computer and adding the ghost host computer to the snapshot of the cluster of physical host computers, the ghost host computer being a fictitious construct based on a physical host computer;
executing a power management analysis on the cluster using the snapshot with the ghost host computer to create a recommendation of powering on the ghost computer or a stand-by physical host computer, wherein a recommendation of powering on the ghost host computer as a result of the power management analysis is converted as a cluster capacity recommendation to increase resource capacity of the cluster of physical host computers, the capacity recommendation specifying at least the capacity of a host computer that should be added;
locating and adding a matching or similar host computer based on the cluster capacity recommendation; and
when the ghost host computer or a second physical host computer in the cluster that is in stand-by mode is selected for power-on during the power management analysis, adding another ghost host computer to the snapshot with the ghost host computer and setting the another ghost host computer to stand-by mode, the another ghost host computer being a duplicate of the ghost host computer or the second physical host computer.

10. The non-transitory computer-readable storage medium of claim 9, wherein the ghost host computer is a duplicate of one of the physical host computers in the cluster.

11. The non-transitory computer-readable storage medium of claim 10, wherein the adding the ghost host computer includes adding at least one ghost host computer for each of the physical host computers in the cluster that is not in stand-by mode, the at least one ghost host computer for each of the physical host computers being a duplicate of that physical host computer in stand-by mode.

12. The non-transitory computer-readable storage medium of claim 9, wherein the ghost host computer is a modified version of the physical host computer such that at least one characteristic of the ghost host computer is modified to have a different value than the corresponding characteristic of the physical host computer.

13. The non-transitory computer-readable storage medium of claim 9, wherein the steps further comprise adding the another ghost host computer to the snapshot when the ghost host computer is selected during the power management analysis for power-on, the another ghost host computer being a duplicate of the ghost host computer.

14. The non-transitory computer-readable storage medium of claim 13, wherein the steps further comprise adding a second another ghost host computer to the snapshot when the another ghost host computer is selected during the power management analysis for power-on, the second another ghost host computer being a duplicate of the another ghost host computer.

15. The non-transitory computer-readable storage medium of claim 9, wherein the steps further comprise adding the another ghost host computer to the snapshot when the second physical host computer in the cluster is selected during the power management analysis for power-on, the another ghost host computer being a duplicate of the selected second physical host computer.

16. The non-transitory computer-readable storage medium of claim 9, wherein the steps further comprise recommending, after the ghost host computer is selected to be powered on by the power management analysis, a physical host computer with same resource capacity of the ghost host computer and connected to same set of datastore and networks as the ghost host computer to increase the resource capacity of the cluster of physical host computers.

17. A cluster management system comprising:
at least one processor;
a cluster capacity management module, executing on the at least one processor, configured to generate a snapshot of a physical cluster comprising physical host computers coupled to the cluster management system that is a representation of a state of the physical cluster, the cluster capacity management module being further configured to generate a ghost host computer add the ghost host computer to the snapshot of the physical cluster, the ghost host computer being a fictitious construct based on a physical host computer; and a power management module, executing on the at least one processor, configured to execute a power management analysis on the snapshot of the physical cluster with the ghost host computer to create a recommendation of powering on the ghost computer or a stand-by physical host computer, wherein a recommendation of powering on the ghost host computer as a result of the power management analysis is converted as a cluster capacity recommendation to increase resource capacity of the cluster of physical host computers, the capacity recommendation specifying at least the capacity of a host computer that should be added, wherein the cluster capacity management module is configured to locate and add a matching or similar host computer based on the cluster capacity recommendation, and wherein the cluster capacity management module is further configured to, when the ghost host computer or a second physical host computer in the cluster that is in stand-by mode is selected for power-on during the power management analysis, add another ghost host computer to the snapshot with the ghost host computer and setting the another ghost host computer to stand-by mode, the another ghost host computer being a duplicate of the ghost host computer or the second physical host computer.

18. The cluster management system 17, wherein the ghost host computer is a duplicate of a physical host computer in the physical cluster.

19. The cluster management system 18, wherein the cluster capacity management module is configured to add at least one ghost host computer for each physical host computer in the physical cluster that is not in stand-by mode, the at least one ghost host computer for each physical host computer being a duplicate of that physical host computer in stand-by mode.

20. The cluster management system 17, wherein the ghost host computer is a modified version of a physical host computer in the physical cluster such that at least one characteristic of the ghost host computer is modified to have a different value than the corresponding characteristic of the physical host computer.

21. The cluster management system 17, wherein the cluster capacity management module is configured to add the another ghost host computer to the snapshot when the ghost host computer is selected during the power management analysis for power-on, the another ghost host computer being a duplicate of the ghost host computer.

22. The method of claim 1, wherein the adding the ghost host computer includes selecting the physical host computer based on which the ghost host computer is fictitiously constructed based on CPU capacity, memory capacity or current or projected host demand of the physical host computer.

* * * * *